United States Patent
Inagaki et al.

(10) Patent No.: US 8,077,295 B2
(45) Date of Patent: Dec. 13, 2011

(54) DISTANCE MEASUREMENT DEVICE

(75) Inventors: Tatsuhiko Inagaki, Kanagawa (JP);
Hiroo Uchiyama, Kanagawa (JP);
Yukihiro Matsushima, Kanagama (JP)

(73) Assignee: Panasonic Corporation, Osaka (JP)

( * ) Notice: Subject to any disclaimer, the term of this patent is extended or adjusted under 35 U.S.C. 154(b) by 88 days.

(21) Appl. No.: 12/597,295

(22) PCT Filed: Aug. 18, 2008

(86) PCT No.: PCT/JP2008/002224
§ 371 (c)(1),
(2), (4) Date: Oct. 23, 2009

(87) PCT Pub. No.: WO2009/034679
PCT Pub. Date: Mar. 19, 2009

(65) Prior Publication Data
US 2010/0128245 A1 May 27, 2010

(30) Foreign Application Priority Data
Sep. 11, 2007 (JP) ................... 2007-235585

(51) Int. Cl.
*G01C 3/08* (2006.01)
*G01C 3/00* (2006.01)
(52) U.S. Cl. ..................... 356/4.01; 356/3.14
(58) Field of Classification Search ............ 356/3.1, 356/4.01, 5, 1, 3.13, 3.14, 3.16
See application file for complete search history.

(56) References Cited

U.S. PATENT DOCUMENTS

| | | | |
|---|---|---|---|
| 6,811,330 B1 | 11/2004 | Tozawa | |
| 7,177,013 B2 * | 2/2007 | Aoyama | 356/4.04 |
| 2009/0135246 A1 * | 5/2009 | Uchiyama et al. | 348/42 |

FOREIGN PATENT DOCUMENTS

| | | |
|---|---|---|
| JP | 11-301365 A | 11/1999 |
| JP | 2001-88623 A | 4/2001 |
| JP | 2003-312376 A | 11/2003 |
| JP | 2003-335180 A | 11/2003 |
| JP | 2007-225543 A | 9/2007 |
| WO | WO 2009097444 A1 * | 8/2009 |

OTHER PUBLICATIONS

International Search Report for PCT/JP2008/002224 dated Sep. 30, 2008.

* cited by examiner

*Primary Examiner* — Isam Alsomiri
(74) *Attorney, Agent, or Firm* — Pearne & Gordon LLP

(57) ABSTRACT

A distance measurement device having better measurement accuracy than conventional distance measurement devices. A stereo camera (1) has a camera stay (4) to be secured to a housing (12) of a vehicle and also has a pair of cameras (2, 3) mounted on the camera stay (4). The camera stay (4) has an installation section (4*a*) located between the pair of cameras (2, 3) and to be mounted on the housing of the vehicle via fixation sections (6, 7, 8). The installation section (4*a*) is movable in the direction of a base line interconnecting the cameras (2, 3).

3 Claims, 4 Drawing Sheets

DISTANCE MEASUREMENT DEVICE

BACKGROUND OF THE INVENTION

1. Field of the Invention

The present invention relates to a distance measurement device, for example, to be mounted on a vehicle, for measuring a distance from the vehicle to an object ahead of the vehicle.

2. Description of Related Art

As a distance measurement device of this type in related art, there is known one that calculates the distance from a vehicle to an object ahead of the vehicle, for example, having two pieces of cameras that are both arranged facing towards ahead of the vehicle with their optical axes being separated from each other by a predetermined distance, based on parallax information of images obtained from the respective cameras. Such a distance measurement device is used in a system, for example, for detecting an inter-vehicle distance and/or sensing an obstacle ahead of the vehicle.

It will be appreciated that, in general, the accuracy of distance measurement relies on the accuracy of alignment of two cameras. Accordingly, when the distance between the two cameras is changed or when the optical axis of one of the cameras is shifted from a predetermined direction, there has been a problem in that the accuracy of distance measurement is deteriorated.

In an attempt to solve this problem, for example, a vehicle mounting camera has been disclosed in Japanese Patent Laid-Open Publication No. 2001-88623. FIG. 4 shows the conceptual structure of such a vehicle mounting camera 21 in related art.

As shown in FIG. 4, the vehicle mounting camera 21 disclosed in Japanese Patent Laid-Open Publication No. 2001-88623 has a pair of cameras 22 and 23, a camera stay 24 for holding the cameras 22 and 23 in predetermined positions, and an installation section 25 in a unified structure with the camera stay 24 to be secured to a housing 26 of a vehicle. The vehicle mounting camera 21 is adapted to accurately maintain the relative positions of the cameras 22 and 23 with respect to each other by being tightly secured to mounting holes 30, 31 and 32 provided on the housing 26 of the vehicle by three screws through three mounting holes 27, 28 and 29 provided in the installation section 25.

SUMMARY OF THE INVENTION

However, the distance measurement device in related art disclosed in Japanese Patent Laid-Open Publication No. 2001-88623 has a problem in that the accuracy of distance measurement is deteriorated, for example, as the device expands when exposed to a direct sunlight and heated to a high temperature. More specifically, while the installation section 25 of the vehicle mounting camera 21 is not likely to expand as it is securely mounted on the housing 26 of the vehicle, the camera stay 24 that is not secured to the housing 26 of the vehicle is liable to expand depending on temperature. Accordingly, in the distance measurement device in related art, there has been a problem in that the accuracy of distance measurement becomes deteriorated as the camera stay 24 distorts due to the difference in expansion between the installation section 25 and the camera stay 24, causing the displacement of a base line that interconnects the cameras 22 and 23 and/or the optical axes of the cameras 22 and 23.

In view of the problems described above, an object of the present invention is to provide a distance measurement device capable of measuring distance more accurately than the conventional devices.

According to a first aspect of the present invention, a distance measurement device for measuring distance to an object comprises a securing body to be secured to a housing, and a pair of distance measuring means for measuring distance provided on the securing body, in which the securing body comprises an installation section that is located between the pair of distance measuring means and is to be mounted on the housing, and the installation section is movable in a direction of a line that interconnects the pair of distance measuring means.

In the distance measurement device described above, as the installation section is movable in the direction of the line interconnecting the pair of distance measuring means, the installation section and the securing body expand or contract in the same manner in response to temperature. Consequently, the distance measurement accuracy of the distance measurement device according to the present invention can be improved comparing to conventional distance measurement devices.

According to a second aspect of the present invention, the distance measuring means may be an imaging device for taking an image of the object.

In the distance measurement device described above, as the installation section is movable in the direction of the line interconnecting the pair of distance measuring means, a base line that interconnects the pair of imaging devices or optical axes of the pair of imaging devices can be prevented from being displaced. Consequently, the distance measurement accuracy of the distance measurement device according to the present invention can be improved comparing to conventional devices.

Further, according to a third aspect of the present invention, the installation section may have a resilient hinge.

In the distance measurement device described above, as the distance measurement device according to the present invention is mounted via the resilient hinge on the housing, the installation section is movable in the direction of the line interconnecting the pair of distance measuring means. Accordingly, the installation section and the securing body expand or contract in the same manner in response to temperature. As a consequence, the distance measurement accuracy of the distance measurement device according to the present invention can be improved comparing to conventional devices.

The present invention can provide a distance measurement device having the effect of improving distance measurement accuracy from the conventional devices.

DESCRIPTION OF REFERENCE NUMERALS

1: STEREO CAMERA (DISTANCE MEASUREMENT DEVICE)
2: CAMERA (DISTANCE MEASURING MEANS)
3: CAMERA (DISTANCE MEASURING MEANS)
4: CAMERA STAY (SECURING BODY)
4a: INSTALLATION SECTION
5: IMAGE PROCESSING UNIT
6, 7, 8: FIXATION SECTION
6a, 7a, 8a: RECEIVING PORTION (RESILIENT HINGE)
6b, 7b, 8b: THROUGH HOLE
6c, 7c, 8c: CONNECTING PORTION (RESILIENT HINGE)
6d, 7d, 8d: GAP
9, 10, 11: SCREW
12: HOUSING
13, 14, 15: HOUSING MOUNTING HOLE

DETAILED DESCRIPTION OF THE INVENTION

Now, with reference to accompanying drawings, an embodiment of the present invention will be described below. Here, a distance measurement device according to the present invention will be exemplified as a distance measurement device for measuring distance from a vehicle to an object ahead of the vehicle by a pair of cameras (hereinafter referred to as "stereo camera").

First, with reference to FIGS. 1 and 2, the structure of the stereo camera according to the present embodiment will be described.

Figure 1:
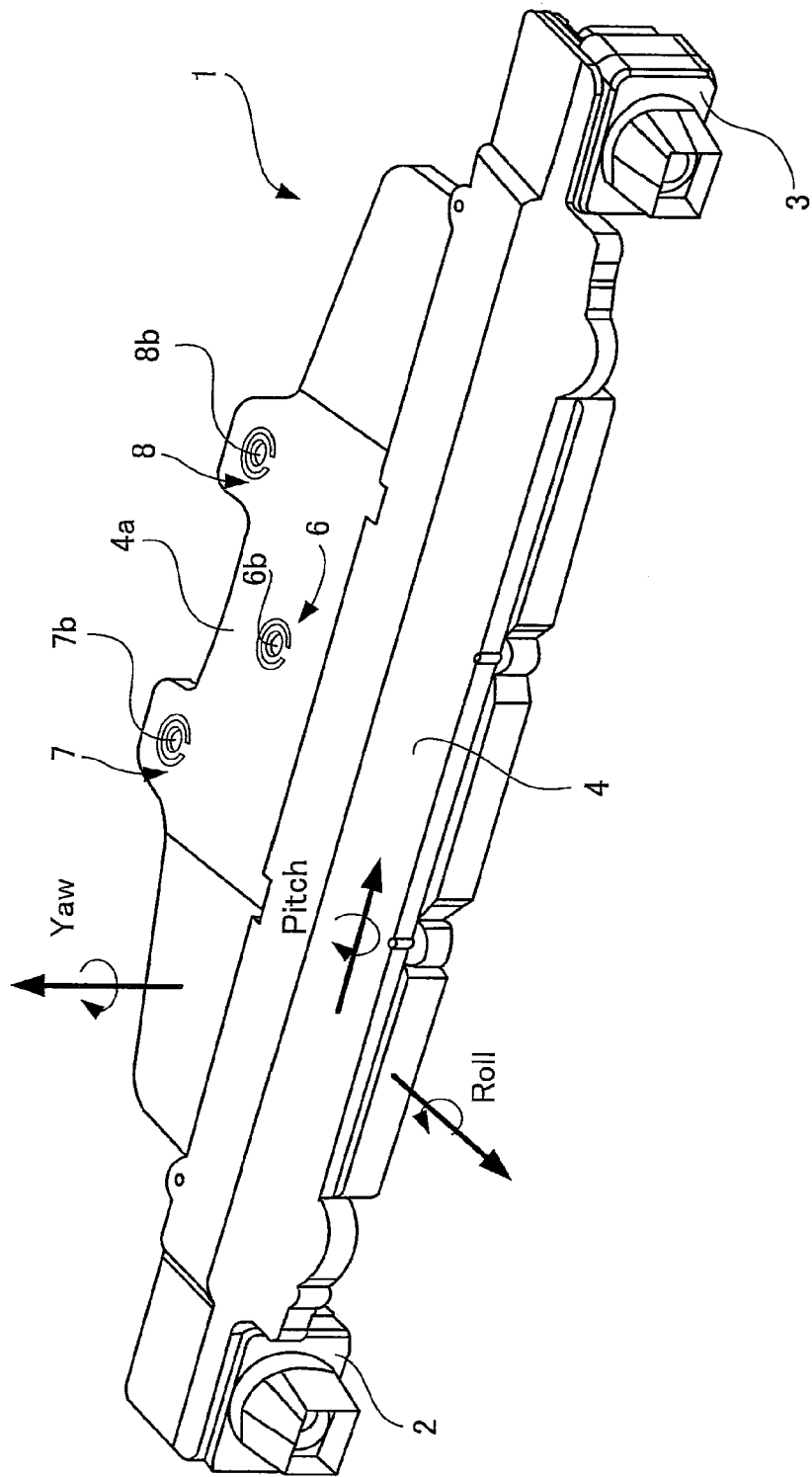
FIG. 1 is a perspective view of a stereo camera for a distance measurement device according to one embodiment of the present invention.

FIG. 1 is a perspective view of a stereo camera 1 according to the present embodiment. FIG. 2 is a perspective view showing the condition of the stereo camera 1 being mounted on a housing of a vehicle according to the present embodiment.

Figure 2:
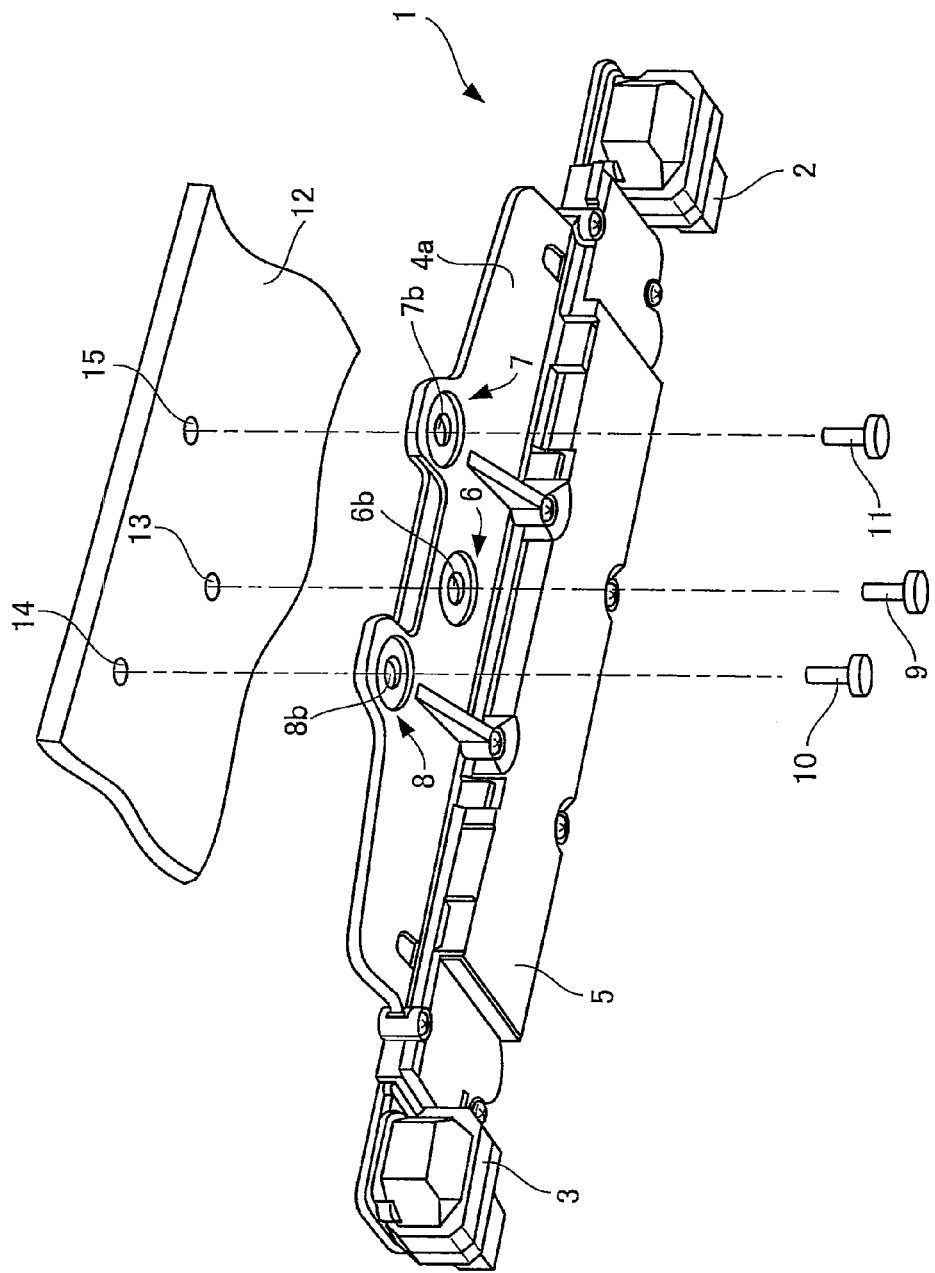
FIG. 2 is a perspective view showing a condition of the stereo camera for the distance measurement device being mounted on a housing of a vehicle according to the one embodiment of the present invention.

As shown in FIGS. 1 and 2, the stereo camera 1 according to the present embodiment includes a pair of cameras 2 and 3 for taking respective images of an object ahead of the vehicle as a photographic subject, a camera stay 4 for holding the cameras 2 and 3 in predetermined positions, and an image processing unit 5 for processing image data of the cameras 2 and 3.

The cameras 2 and 3 of the pair, although their details are not shown, are each provided with a lens for focusing reflected light from a subject, an optical iris for adjusting the amount of incident light entering through the lens, and an image element for photoelectrically converting the light from the subject to an electrical signal, and are adapted to take the respective images of the object ahead of the vehicle.

The camera stay 4 is light in weight and high in rigidity and is formed of a metal or an alloy having a high thermal conductivity, for example, aluminum alloy. The use of aluminum alloy makes it possible to realize the stereo camera to be lightweight. Further, as the heat generated by the image processing unit 5 mounted on the camera stay 4 is efficiently dissipated, thus the stereo camera having high reliability can be obtained. The camera stay 4 constitutes a securing body according to the present invention.

The camera stay 4 is provided with an installation section 4a. The installation section 4a is provided with fixation sections 6, 7 and 8 for securing the camera stay 4 to a housing 12 of the vehicle. In FIG. 2, the fixation sections 6 to 8 are shown somewhat simplified for purposes of illustration. The fixation sections 6, 7 and 8 are arranged so as to form an equilateral triangle with the fixation section 6 as a top vertex. The structure of the fixation sections 6 to 8 will be described in details hereinafter.

As described above, since the camera stay 4 is secured to the housing 12 of the vehicle through the fixation sections 6 to 8 of the installation section 4a, the camera stay 4 can be prevented from being twisted in directions of three coordinate axes PITCH, ROLL and YAW shown in FIG. 1. Here, in the coordinate axes shown in FIG. 1, the PITCH represents the direction of rotation about an arbitrary axis in parallel with a direction of a base line that interconnects the cameras 2 and 3, the ROLL represents the direction of rotation about an arbitrary axis in parallel with a direction of optical axes of the cameras 2 and 3, and the YAW represents the direction of rotation about an arbitrary axis perpendicular to the plane which includes the base line interconnecting the cameras 2 and 3 and the optical axes of the cameras 2 and 3. It will be appreciated that the base line interconnecting the cameras 2 and 3 is, for example, the line interconnecting the center of an imaging area of the image element of the camera 2 and that of the camera 3.

The image processing unit 5, although not shown in details, includes, for example, an image processing circuit board for processing the image data of the cameras 2 and 3, a speaker for outputting voice and/or an alarm sound, and an indicator lamp for emitting a warning light. The image processing unit 5 carries out image processing based on the image data provided by the cameras 2 and 3. More specifically, the image processing unit 5 is adapted to calculate the distance from the vehicle to an object ahead of the vehicle based on the principle of triangulation using the amount of displacement, i.e., parallax difference, between the object position ahead of the vehicle obtained from the image of the camera 2 and that obtained from the image of the camera 3.

The housing 12 of the vehicle is provided with housing mounting holes 13, 14 and 15. The camera stay 4 holding the cameras 2 and 3 is securely tightened to the housing 12 of the vehicle with three screws 9, 10 and 11 through the fixation sections 6, 7 and 8 provided in the installation section 4a of the camera stay 4.

Figure 3:
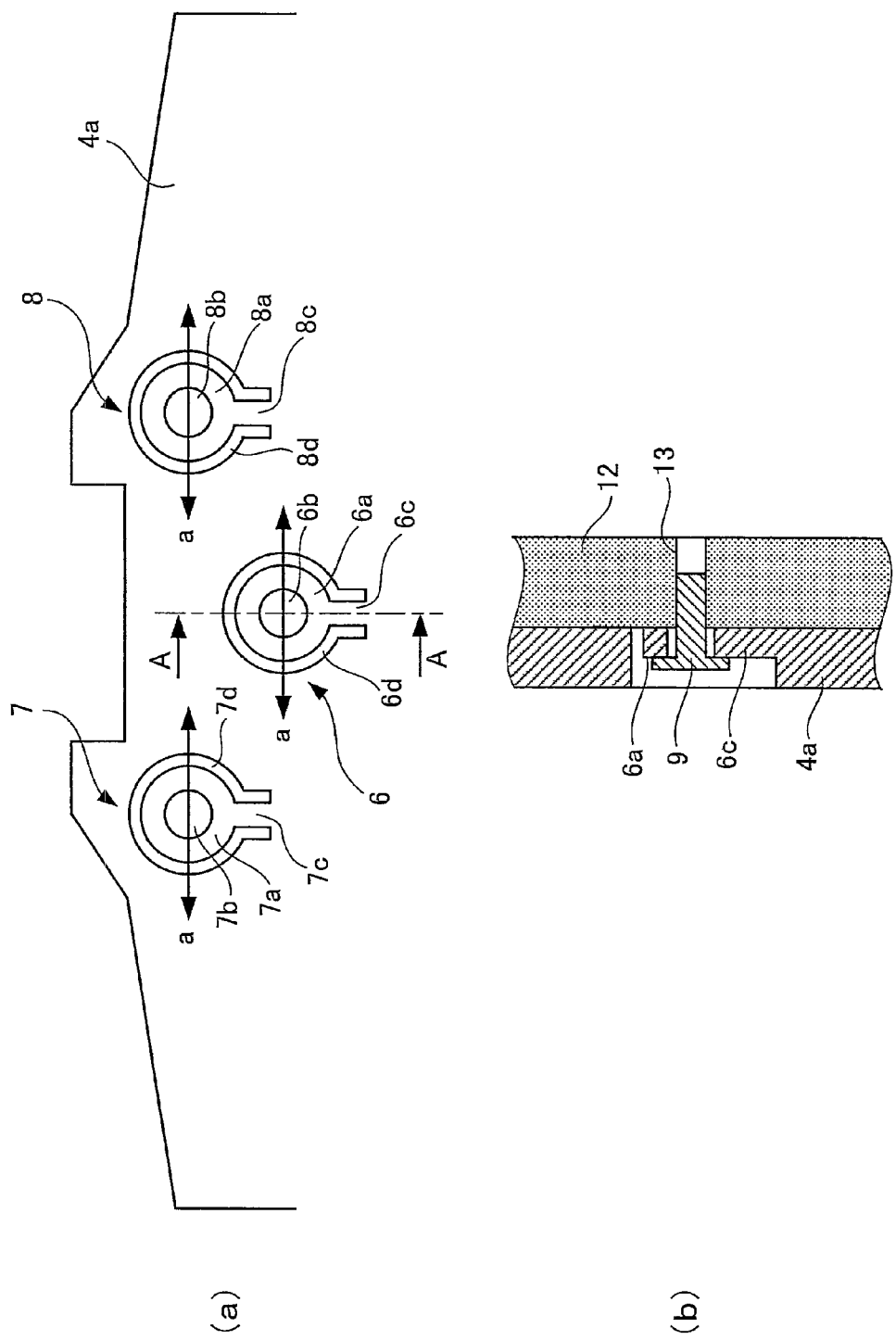
FIGS. 3A and 3B are conceptual views showing a fixation section of an installation section of the stereo camera for the distance measurement device according to the one embodiment of the present invention, FIG. 3A being a plan view showing the conceptual structure of the fixation section in the installation section of the stereo camera for the distance measurement device, and FIG. 3B being a cross-sectional view taken along the line A-A shown in FIG. 3A showing the fixation section of the installation section of the stereo camera for the distance measurement device as mounted on an installation section of the vehicle.
Figure 4:
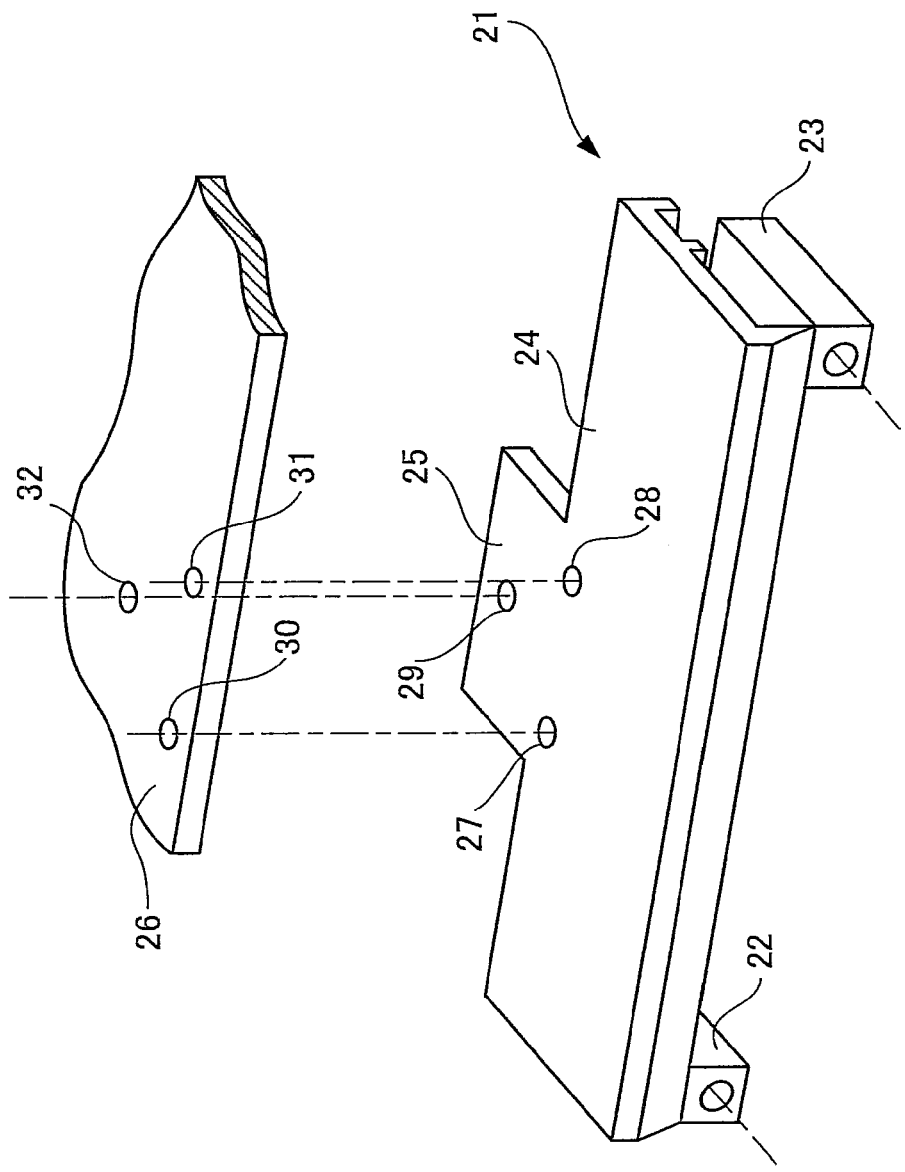
FIG. 4 is a perspective view of a vehicle mounting camera in related art.

FIGS. 3A and 3B are conceptual views showing the fixation sections 6, 7 and 8 in the installation section 4a of the stereo camera 1 according to the present embodiment. FIG. 3A is a plan view showing the conceptual structure of the fixation sections 6, 7 and 8 of the installation section 4a, and FIG. 3B is a cross-sectional view taken along the line A-A shown in FIG. 3A showing the fixation section 6 (including the cross-sectional view of the screw 9) of the stereo camera 1 according to the present embodiment as mounted on the housing 12 of the vehicle.

Now, the structure of the fixation sections 6, 7 and 8 in the installation section 4a of the stereo camera 1 according to the present embodiment will be described below with the fixation section 6 as an example.

As shown in FIGS. 3A and 3B, the fixation section 6 has a receiving portion 6a formed with a through hole 6b therein and a connecting portion 6c that connects the receiving portion 6a with the installation section 4a of the camera stay 4.

The receiving portion 6a and the connecting portion 6c constitute a resilient hinge according to the present invention.

It will be appreciated that the receiving portion 6a formed with the through hole 6b is adapted to receive the head of the screw 9. Accordingly, it is preferable that the outer diameter of the receiving portion 6a be equal or similar in size to the outer diameter of the head of the screw 9 as shown in FIG. 3B. The connecting portion 6c is adapted to connect the receiving portion 6a with the installation section 4a of the camera stay 4 in alignment with a line that intersects the base line interconnecting the cameras 2 and 3 at right angles. Further, between the receiving portion 6a of the fixation section 6 and the installation section 4a of the camera stay 4, except for the connecting section 6c, a gap 6d is formed which separates the receiving portion 6a of the fixation section 6 from the installation section 4a of the camera stay 4.

It is preferable that the respective thicknesses of the installation section 4a, receiving portion 6a, and connecting portion 6c be appropriately determined by considering such conditions as the strength of material constituting the camera stay 4, the weight of the stereo camera 1, and the range of operating temperatures.

In the arrangement described above, since the connecting portion 6c can be tilted in the direction parallel to the direction of arrows "a" shown in FIG. 3A, i.e., the base line direction, with the through hole 6b acting as a fulcrum point, the fixation section 6 of the camera stay 4 is movable in the direction of the base line interconnecting the cameras 2 and 3. As a consequence, in the stereo camera 1, the camera stay 4 and the installation section 4a are to expand or contract in the same manner in response to temperature.

In FIGS. 3A and 3B, it will be appreciated that, while the fixation section 6 has been exemplified, the other fixation sections 7 and 8 have the same structure as the fixation section 6.

Next, the operation of the stereo camera 1 according to the present embodiment will be described below.

The cameras 2 and 3 each takes the image of an object ahead of the vehicle and outputs the data of the image taken to the image processing unit 5.

The image processing unit 5 then calculates the distance from the vehicle to the object ahead of the vehicle based on the principle of triangulation with the image data received from the cameras 2 and 3.

Subsequently, when the distance from the vehicle to the object ahead of the vehicle matches a predetermined distance, the image processing unit 5 may sound a voice message and/or an alarm sound and flash the indicator lamp to warn a driver that, for example, an inter-vehicle distance is below a predetermined value.

In the process of calculating distance by the image processing unit 5 described above, when the displacement of the base line interconnecting the pair of cameras 2 and 3 and/or the displacement of the optical axes of the cameras 2 and 3 relative to each other arises from the expansion or contraction of the camera stay 4, the accuracy of distance measurement from the vehicle to the object ahead of the vehicle is deteriorated.

However, in the stereo camera 1 thus structured according to the present embodiment, as the installation section 4a is movable in the base line direction, the base line interconnecting the cameras 2 and 3 and/or the optical axes of the cameras 2 and 3 relative to each other can be prevented from being displaced even when the camera stay 4 expands or contracts. Accordingly, the distance measurement accuracy can be improved.

Consequently, the stereo camera 1 can detect, for example, the inter-vehicle distance to a vehicle ahead of the vehicle and/or the distance from the vehicle to an obstacle ahead with higher accuracy than the conventional devices.

As described in the foregoing, in the stereo camera 1 of the embodiment according to the present invention, even when the camera stay 4 expands or contracts in response to surrounding temperature of the stereo camera 1, as the installation section 4a of the camera stay 4 is movable in the base line direction, the installation section 4a and camera stay 4 expand or contract in the same manner in response to temperature, thereby preventing the base line interconnecting the cameras 2 and 3 and/or the optical axes of the cameras 2 and 3 from being displaced. Accordingly, the distance measurement accuracy can be improved comparing to conventional distance measurement devices.

In the embodiment described above, while the cameras 2 and 3 have been exemplified as distance measuring means, the present invention is not limited as such. As long as the distance measuring means measure the distance based on the principle of triangulation, any means for measuring distance, for example, means that utilize a radio wave or a sonic wave may be used.

Further, in the embodiment described above, the number of fixation sections has been exemplified as three. The present invention is not limited to that and the number of fixation sections may be two, or more than three.

Furthermore, in the embodiment described above, while the pair of cameras 2 and 3 has been exemplified to have single cameras 2 and 3 arranged as a pair as shown in FIG. 1, the present invention is not limited as such. For example, a plurality of cameras may be arranged at one end of the camera stay 4 in place of the camera 2 and a plurality of cameras being the same in number as the camera 2 may be arranged in place of the camera 3 at the other end of the camera stay 4.

Moreover, in the embodiment described above, the connecting portion 6c is not limited to that shown in FIG. 3A and, as long as the installation section 4a of the camera stay 4 is movable in the base line direction, two pieces of the connecting portions 6c for connecting the receiving portion 6a with the installation section 4a may be provided on the line intersecting the base line interconnecting the cameras 2 and 3 at right angles.

INDUSTRIAL APPLICABILITY

As described in the foregoing, the distance measurement device according to the present invention has an advantage of improving distance measurement accuracy over conventional distance measurement devices and is useful as a vehicle mounting distance measurement device for measuring distance from a vehicle to an object ahead of the vehicle.

What is claimed is:

1. A distance measurement device for measuring distance to an object, comprising:
    a securing body to be secured to a housing; and
    a pair of distance measuring means for measuring distance provided on the securing body, wherein
        the securing body comprises an installation section that is located between the pair of distance measuring means and is to be mounted on the housing, and
        the installation section is movable only in a direction of a line that interconnects the pair of distance measuring means.

2. The distance measurement device as set forth in claim 1, wherein the distance measuring means is an imaging device for taking an image of an object.

3. The distance measurement device as set forth in claim 1, wherein the installation section has resilient hinges.

* * * * *